Aug. 26, 1958 H. W. LARSEN ET AL 2,848,882
DRIVE NOISE INSULATING MEANS
Filed Nov. 25, 1955 2 Sheets-Sheet 1

INVENTORS.
Hugh W. Larsen,
George H. Primeau, &
William O. Robbins
BY
L. D. Burch
ATTORNEY.

United States Patent Office 2,848,882
Patented Aug. 26, 1958

2,848,882

DRIVE NOISE INSULATING MEANS

Hugh W. Larsen, Milford, George H. Primeau, Grosse Pointe, and William O. Robbins, West Bloomfield Township, Birmingham, Mich., assignors to General Motors Corporation, Detroit, Mich., a corporation of Delaware Application November 25, 1955, Serial No. 548,996

7 Claims. (Cl. 64—1)

This invention relates to drive noise insulating means generally and more particularly to the use of such means for preventing the transmission of road and vehicle drive noises through vehicle drive shafts.

Of late much has been done in automotive vehicles to eliminate the transmission of road and vehicle drive noises through vehicle drive means to the vehicle body where they are magnified much to the annoyance of vehicle passengers. The elimination or attenuation of these objectionable noises has included the use of different types of resilient mounting means and has required closer tolerances in gear members of differential drive units. However, the previous use of resilient type noise insulation means has not proven too successful because of problems of durability, balance, control and the expense of materials, fabrication and installation. At the same time, present mass production methods and gear manufacturing processes do not permit closer gear tolerances without considerable added expense.

It is here proposed to provide means for isolating drive noise and eliminating or preventing the transmission of such noises through vehicle drive shafts and the like. It is proposed to provide drive means having sufficient axial or longitudinal flexibility to dissipate drive noises which it receives while retaining adequate torsional rigidity for the safe transmission of drive torque. The proposed vehicle drive shaft means further prevent the transmission of transient vibrations therethrough by intercepting such vibrations and in changing the resonant character of the drive shaft means.

Figure 1:
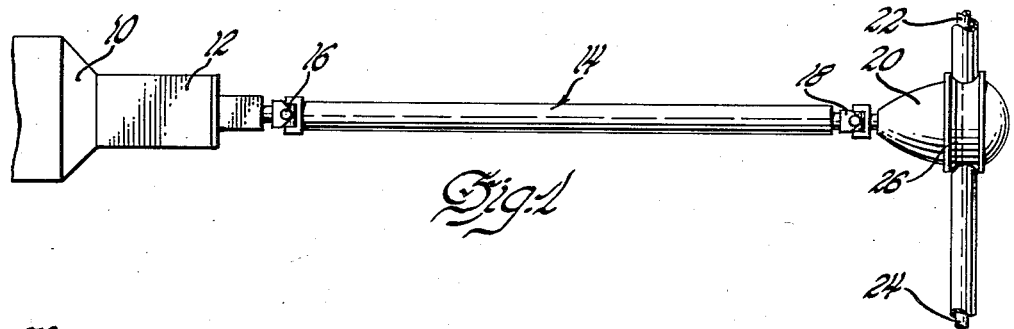
Figure 1 is of vehicle drive means including the present invention.

Conventional known vehicle drive means are such as are shown generally by Figure 1 of the drawings to include a power transmission train comprising an engine 10 and transmission 12, shown diagramatically, a drive shaft 14 connected to the output end of the transmission by suitable power transmitting connections, such as universal joint means 16, a differential drive unit 20 having the input side thereof connected to the drive shaft, as by universal joint means 18, and axle shafts 22 and 24 extending from the differential unit through an axle housing 26.

The usual drive shaft is tubular and has a yoke of the universial joint means 16 and 18 secured to the ends thereof. Such a shaft has a certain natural frequency and being hollow, has certain resonant characteristics. Because of the metal-to-metal contact within the driven means following through from the axle shafts 22 and 24, into the drive gears (not shown) of the differential unit 20, to the drive shaft 14, any transient vibration received at the driven end of the drive shaft is magnified and passed on through the drive shaft to engine and drive support means and into the vehicle body with which the drive means are used.

Figure 2:
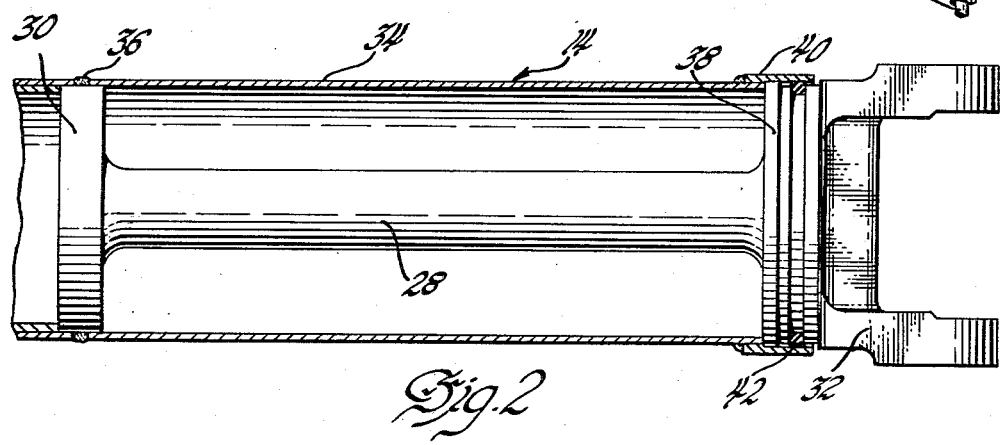
Figure 2 is an enlarged cross-sectional view of the after end of a vehicle drive shaft including the present invention.

The driven end of the drive shaft, shown by Figure 2, includes a stub or reduced diameter shaft 28 including a flange 30 at one end thereof and a universal yoke 32 at the other end. The stub shaft 28 is disposed within the tubular end 34 of the drive shaft and has the flange secured in spaced relation from the end thereto as by welding 36. The extreme end of the tubular drive shaft abuts the collar 38 of the universal joint yoke 32 and a centering or locating sleeve ring 40 is secured thereto and received about the yoke collar 38. An O-ring 42 is spaced between the sleeve ring 40 and the yoke collar 38.

The drive torque transmitted through the tubular drive shaft shown by Figure 2 is through flange 30 to the stub shaft 28, which is shown as solid, and on to the universal yoke 32 which is connected to the differential drive means. At the same time any transient vibrations emanating from the drive means beyond the after universal joint must pass from the universal yoke 32, back through the stub shaft 28, to reach the tubular drive shaft. The reduced section stub shaft means provides torsional stiffness within safe load limits and the flange or interconnecting stepped portion 30 thereof provides a limited degree of longitudinal or axial flexibility within the drive shaft means. Furthermore, the drive connection between the tubular drive shaft and the stub shaft 28 being spaced from the end of the tubular shaft changes its natural frequency and resonant character.

Figure 3:
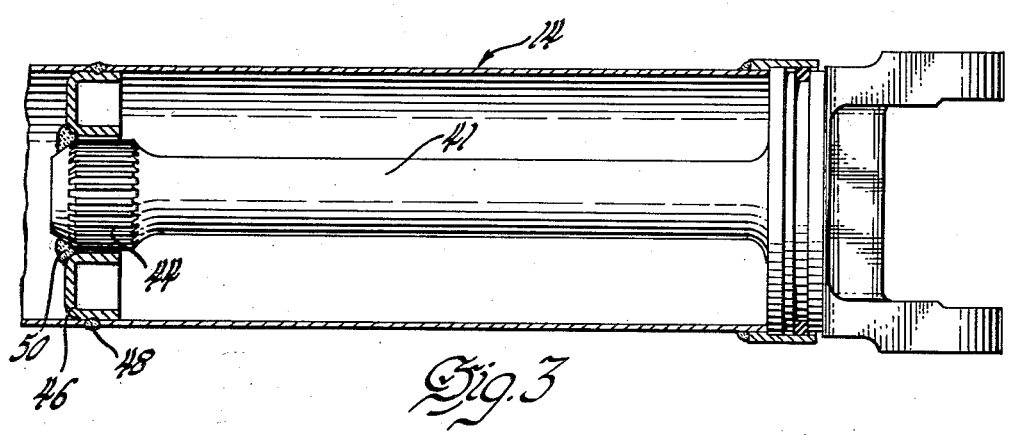
Figures 3 through 6 are cross-sectional views of other modified drive shaft means also including the teachings of the present invention.

Figure 3 shows drive means similar to those of Figure 2; except that the end of the stub shaft 41 is knurled or splined, as at 44, and engaged with an annular member 46, itself secured or drive connected, as by welding 48, to the tubular shaft. The annular member 46 and stub shaft 41 may be secured together, as by welding 50, if advisable. In either event, the same characteristics attributed to the arrangement of the shaft means of Figure 2 are apparent.

Figure 4:
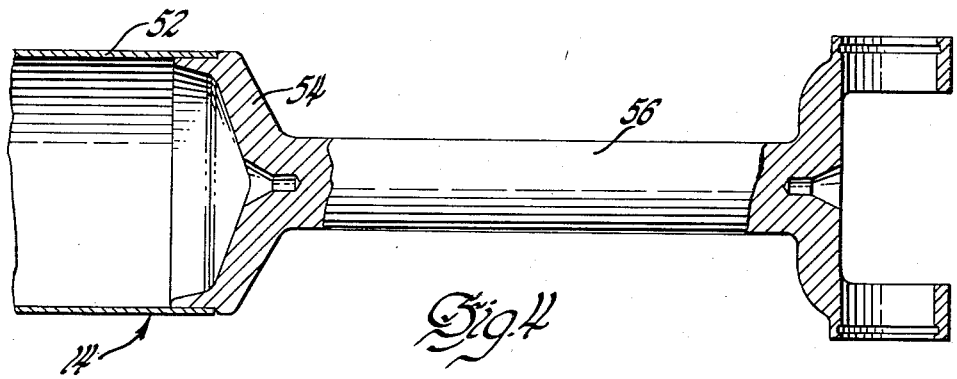

Figure 4 is of another form of drive means, including the present invention, which has the end 52 of the tubular drive shaft secured to the flange 54 of an exposed stub shaft 56. In this particular form of noise insulation means it has been found that with a drive shaft approximately 44 inches long and having a 3 inch O. D., a stub shaft 9 inches long and having a 1 inch O. D. is most satisfactory in attenuating objectionable drive noises.

Figure 5:
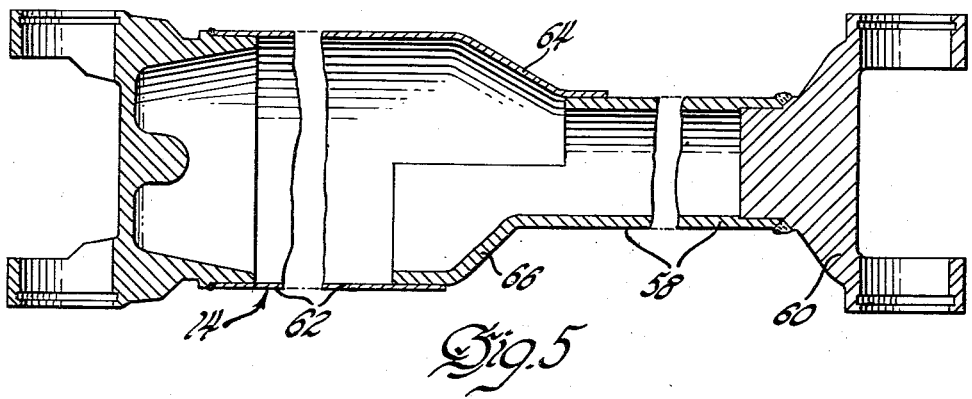

Figure 5 shows a tubular stub shaft 58 secured to a universal joint yoke 60 and the end 62 of a tubular drive shaft. The drive shaft may be necked down to the size of the stub shaft, as at 64, or the stub shaft may be swaged to the diameter of the drive shaft, as at 66.

Figure 6:
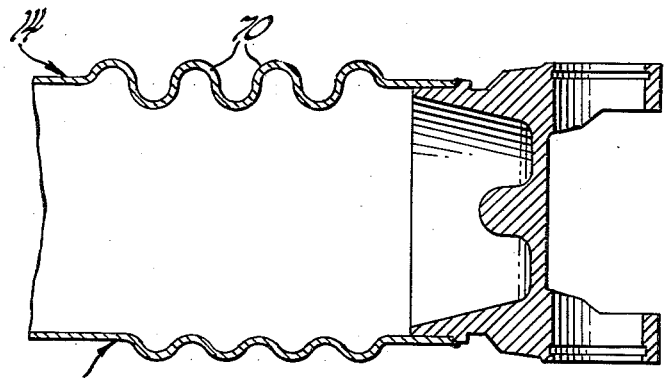

Figure 6 is a still further modification of a drive shaft to include the teachings of the present invention. The after end 68 of the tubular drive shaft is beaded or formed with bellows rolls or pleats 70 to provide the extent of longitudinal flexibility necessary to attenuate objectionable drive noises within the drive means.

We claim:

1. Drive noise insulating means which includes a tubular drive shaft extending between power transmitting connections, a stub shaft rigidly secured to one of said power transmitting connections and extended within one end of said drive shaft, a flange formed upon the end of said stub shaft within said drive shaft, and means securing said flange to said drive shaft in spaced relation to one end thereof for the transmission of torque from said tubular shaft to said stub shaft, said flange being formed to provide limited axial flexibility between said drive and stub shafts.

2. Drive noise insulation means for use with a tubular drive shaft and including a drive transmitting stub shaft of reduced cross-section rigidly secured at one end to a vehicle power transmitting connection an annular flange formed at the other end of said drive transmitting stub shaft and secured to the drive end of said drive shaft, said flange being formed to provide torsional stiffness and longitudinal flexibility within the drive transmitting means including said drive and stub shafts.

3. Drive noise insulation means including a tubular drive shaft extending between vehicle power transmitting connections, a tubular stub shaft of reduced cross-section with respect to said drive shaft and rigidly secured to one of said vehicle power transmitting connections, one of said shafts being formed to provide a connecting flange for securing said shafts together, said flange having torsional stiffness and limited axial flexibility for the dissipation of drive noises received by said stub shaft.

4. Drive noise insulation means comprising, a drive shaft having power transmitting connections at opposite ends thereof, shaft means of reduced cross sectional area with respect to said drive shaft and rigidly secured to one of said power transmitting connections at one end of said drive shaft and having a radially flexible annular flange at the opposite end thereof, said radially flexible annular flange being rigidly secured at the outer edge thereof to said drive shaft, said flexible annular flange providing limited axial flexibility within said drive shaft for attenuating objectionable drive noise within said drive shaft.

5. Vehicle drive noise insulation means including a tubular vehicle drive shaft extending between power transmitting connections, a drive transmitting stub shaft received concentrically within one end of said drive shaft and rigidly secured to one of said vehicle drive transmitting connections, a flange on the opposite end of said stub shaft from said power transmitting connection and secured to said drive shaft in spaced relation to the said one end thereof, said flange being formed to provide torsional stiffness and limited longitudinal flexibility in the drive connection between said shafts.

6. Drive noise insulation means as provided for by claim 5 having a collar formed upon the end of said stub shaft rigidly connected to said power transmitting connection and having said tubular drive shaft received and centered upon said collar.

7. Drive noise insulation means as provided for by claim 5 having a spline portion on the opposite end of said stub shaft from said rigidly connected end for connecting said stub shaft to said annular flange.

References Cited in the file of this patent
UNITED STATES PATENTS

| 1,471,143 | Cromwell | Oct. 16, 1923 |

FOREIGN PATENTS

| 459,084 | Great Britain | Jan. 1, 1937 |
| 691,281 | Great Britain | May 6, 1953 |